(12) United States Patent
Jiang et al.

(10) Patent No.: US 12,411,057 B1
(45) Date of Patent: Sep. 9, 2025

(54) CLOTHING WINDPROOF PERFORMANCE TESTING TOOL AND TESTING METHOD

(71) Applicant: BOSIDENG DOWN WEAR LIMITED, Jiangsu (CN)

(72) Inventors: Hui Jiang, Jiangsu (CN); Qiannan Zheng, Jiangsu (CN); Song Tang, Jiangsu (CN)

(73) Assignee: BOSIDENG DOWN WEAR LIMITED, Jiangsu (CN)

( * ) Notice: Subject to any disclaimer, the term of this patent is extended or adjusted under 35 U.S.C. 154(b) by 0 days.

(21) Appl. No.: 19/218,600

(22) Filed: May 26, 2025

Related U.S. Application Data

(63) Continuation of application No. PCT/CN2024/120723, filed on Sep. 24, 2024.

(30) Foreign Application Priority Data

Nov. 3, 2023 (CN) .......................... 202311453779.8

(51) Int. Cl.
*G01M 9/04* (2006.01)

(52) U.S. Cl.
CPC ..................................... *G01M 9/04* (2013.01)

(58) Field of Classification Search
None
See application file for complete search history.

(56) References Cited

U.S. PATENT DOCUMENTS

| 11,105,096 B2 * | 8/2021 | Baggs | ........................ B32B 5/26 |
| 2016/0187103 A1 | 6/2016 | Coats | |

FOREIGN PATENT DOCUMENTS

| CA | 2593994 A1 * | 6/2008 | ........... A41D 31/102 |
|----|-------------|---------|------------------------|
| CN | 101487783 | 7/2009 | |
| CN | 110779847 | 2/2020 | |
| CN | 113533427 | 10/2021 | |
| CN | 114563298 | 5/2022 | |
| CN | 117191671 | 12/2023 | |

OTHER PUBLICATIONS

"International Search Report (Form PCT/ISA/210) of PCT/CN2024/120723," mailed on Nov. 20, 2024, pp. 1-3.
"Written Opinion of the International Searching Authority (Form PCT/ISA/237) of PCT/CN2024/120723," mailed on Nov. 20, 2024, pp. 1-4.

* cited by examiner

*Primary Examiner* — Peter J Macchiarolo
*Assistant Examiner* — Jermaine L Jenkins
(74) *Attorney, Agent, or Firm* — JCIPRNET

(57) ABSTRACT

Disclosed is a clothing windproof performance testing tool, including a dummy having a transparent back panel, vertical partitions, and horizontal partitions; where the transparent back panel has a projected contour of a human torso, the vertical partitions are fixed onto the back panel at intervals in a horizontal direction, a front side edge of each vertical partition has a concave-convex structure, which forms a three-dimensional contour of the human torso around front side edges of the vertical partitions; and the horizontal partitions are fixed onto the transparent back panel at intervals, and fixedly connected to the vertical partitions, the vertical and horizontal partitions are enclosed to form a plurality of test compartments, each test compartment is provided with a test fabric strip, an upper end of the test fabric strip is connected to a top surface of the test compartment, and a lower end thereof is left hanging freely.

11 Claims, 1 Drawing Sheet

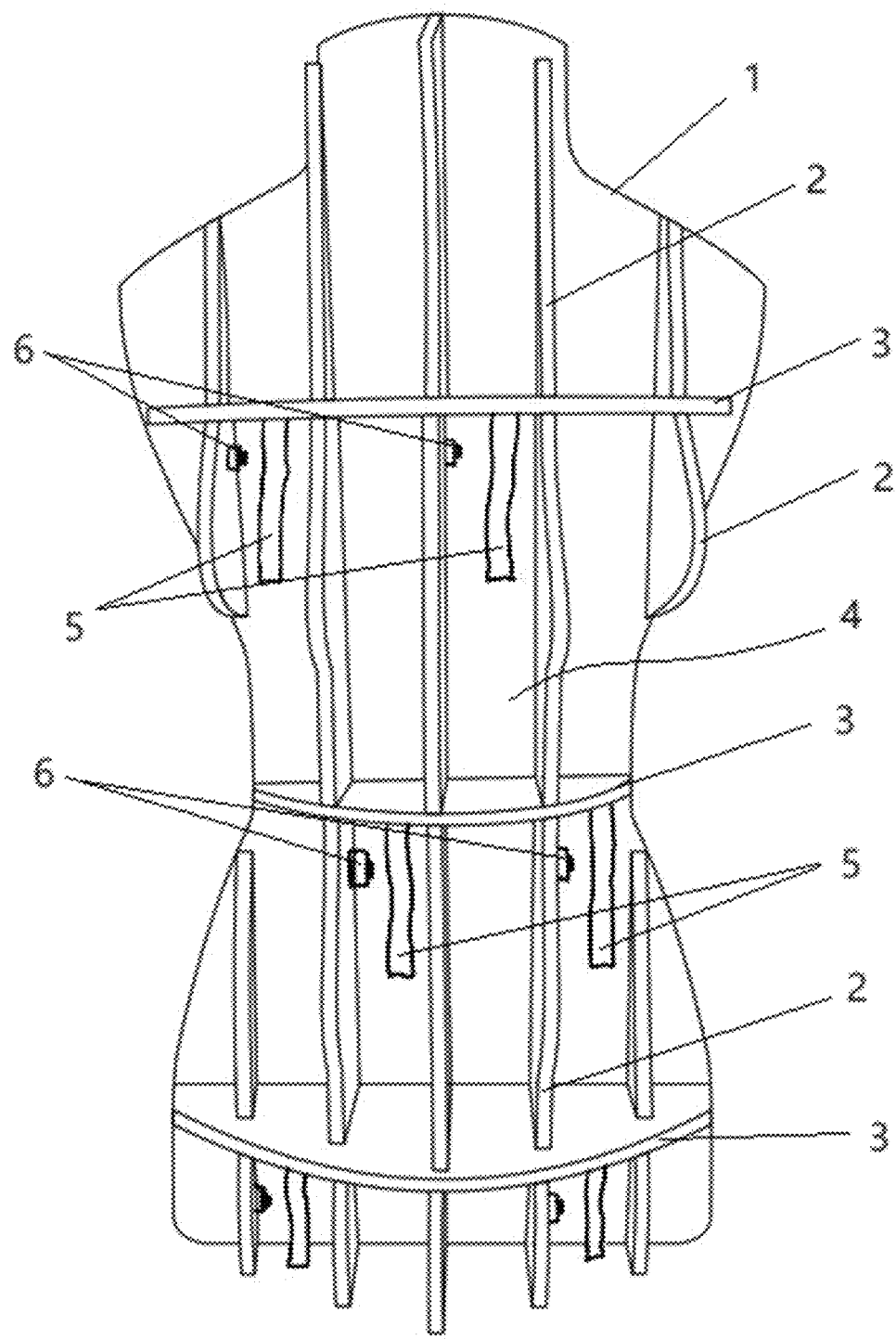

CLOTHING WINDPROOF PERFORMANCE TESTING TOOL AND TESTING METHOD

CROSS-REFERENCE TO RELATED APPLICATION

This application is a continuation of international application of PCT application serial no. PCT/CN2024/120723, filed on Sep. 24, 2024, which claims the priority benefit of China application no. 202311453779.8, filed on Nov. 3, 2023. The entirety of each of the above-mentioned patent applications is hereby incorporated by reference herein and made a part of this specification.

TECHNICAL FIELD

The present disclosure relates to clothing testing tools and testing methods, and particularly relates to a clothing windproof performance testing tool and testing method.

TECHNICAL BACKGROUND

Existing clothing windproof performance tests mainly focus on the fabric itself, and the fabric windproof performance is usually determined based on air permeability, which is not an intuitive method. When the clothing is tested according to the method designed for fabric windproof performance, front and back panels of the clothing form two barriers, making it difficult to accurately evaluate windproof performance of a single layer of the clothing when it is actually worn. In addition, a shape of the clothing when being worn will also affect the airflow, thereby changing testing results.

At present, there is no tool or method available to intuitively and accurately test the windproof performance of the clothing in a wearing state.

SUMMARY OF THE INVENTION

In view of the shortcomings in the prior art, the present disclosure provides a clothing windproof performance testing tool to test wind resistance when the clothing is worn in an intuitive and accurate manner, avoiding the influence from clothing appearance factors. The present disclosure further provides a clothing windproof performance testing method.

The present disclosure adopts the following technical solution: a clothing windproof performance testing tool, including a dummy, where the dummy includes a transparent back panel, vertical partitions, and horizontal partitions; the transparent back panel has a projected contour of a human torso, the vertical partitions are fixed onto the back panel at intervals in a horizontal direction, a front side edge of each vertical partition has a concave-convex structure, which forms a three-dimensional contour of the human torso around front side edges of the vertical partitions; and the horizontal partitions are fixed onto the transparent back panel at intervals and are also fixedly connected to the vertical partitions, the vertical partitions and the horizontal partitions are enclosed to form a plurality of test compartments, each test compartment is provided with a test fabric strip, an upper end of the test fabric strip is connected to a top surface of the test compartment, and a lower end of the test fabric strip is left hanging freely.

During the test, the dummy in the present disclosure is worn half of the clothing, and movement states of the test fabric strips re observed through the transparent back panel to evaluate wind resistance of the clothing.

Further, in order to continuously and easily observe the test fabric strips and facilitate the test operation, the present disclosure adopts another technical solution as follows: a clothing windproof performance testing tool, including a dummy, where the dummy includes a back panel, vertical partitions, and horizontal partitions; the back panel has a projected contour of a human torso, the vertical partitions are fixed onto the back panel at intervals in a horizontal direction, a front side edge of each vertical partition has a concave-convex structure, which forms a three-dimensional contour of the human torso around front side edges of the vertical partitions; and the horizontal partitions are fixed onto the back panel at intervals and are also fixedly connected to the vertical partitions, the vertical partitions and the horizontal partitions are enclosed to form a plurality of test compartments, each test compartment is provided with a test fabric strip and an image sensor, an upper end of the test fabric strip is connected to a top surface of the test compartment, a lower end of the test fabric strip is left hanging freely, and the image sensor is configured to capture state images of the test fabric strips.

By incorporating the image sensor, the present disclosure can use an ordinary back plate to make a dummy, and the dummy can be fully dressed during test without special treatment, which makes the operation more convenient, an operator can observe from outside a test environment, improving both safety and convenience of the test.

Further, the upper end of the test fabric strip is connected to a front side edge of the horizontal partition.

Further, a length of the test fabric strip is 10-15 cm.

Further, the horizontal partitions are arranged at positions corresponding to a hip girth line, a waist girth line and a bust girth line of the dummy.

Further, a distance between adjacent vertical partitions is 8-10 cm.

The present disclosure provides yet another technical solution: a clothing windproof performance testing method, which is conducted based on the aforementioned clothing windproof performance testing tool. Specifically, the clothing to be tested is worn on the dummy, and a fan is placed in front of the dummy to blow toward the dummy at a fixed wind speed; by observing fluttering states of the test fabric strips on the dummy, a windproof level of the clothing is determined according to the fluttering states of the test fabric strips; when the test fabric strips are continuously kept parallel to the horizontal partitions, the windproof level is Level 0; when the test fabric strips flutter in an inclined manner, and a distance between the lower end of the test fabric strip and the horizontal partition connected to the test fabric strip is less than 1 cm, the windproof level is Level 1; when the test fabric strips flutter continuously in a form of flapping, the windproof level is Level 2; when the test fabric strips flutter intermittently, the windproof level is Level 3; and when the test fabric strips are stationary, the windproof level is Level 4.

The technical solutions provided by the present disclosure have the following advantages: the present disclosure is applicable to the testing of windproof performance of all outerwear, and the clothing windproof performance can be observed intuitively, without the need for testing fabric air permeability. The windproof performance test tool provided by the present disclosure is simple to manufacture and operate, and the corresponding clothing windproof level test results can be easily obtained through the fluttering states of the fabric strips.

DESCRIPTION OF THE DRAWINGS

FIG. 1 is a schematic structural diagram of a clothing windproof performance testing tool.

DETAILED DESCRIPTIONS OF THE EMBODIMENTS

The present disclosure will be further described below in conjunction with the embodiments. It should be understood that these embodiments are only intended to illustrate, rather than limit, the scope of the present disclosure. Various modifications in equivalent forms made by those skilled in the art after reading through the present disclosure should fall within the scope defined by the appended claims of the present disclosure.

With reference to FIGURE, this embodiment provides a clothing windproof performance testing tool, including a dummy, which is mainly composed of a back panel 1, vertical partitions 2, and horizontal partitions 3; where the back panel 1, the vertical partitions 2, and the horizontal partitions 3 may be made of multilayer solid wood sheets, specifically composed of more than three layers of 1 mm-thick thin solid wood sheet through hot pressing with adhesive, and have high strength and good stability.

A shape of the dummy is determined based on a human torso. In this embodiment, the dummy represents a front half of the human torso, and is designed for a frontal windproof performance test. The back panel 1 is contoured according to the front projection contour of the human torso, and the vertical partitions 2 and the horizontal partitions 3 are fixed on a front side of the back panel 1. The horizontal partitions 3 are arranged perpendicular to the back panel 1, and are respectively arranged at positions corresponding to a hip girth line, a waist girth line and a bust girth line. According to a standard female body shape, the hip girth line is 12 cm away from a lower end of the dummy, the waist girth line is 28 cm away from the hip girth line, the bust girth line is 24 cm away from the waist girth line, and one horizontal partition 3 may also be arranged at a neck girth line at a topmost position. An outer perimeter of each horizontal partition 3 is determined according to the standard female body shape, that is, a bust girth is set to 84 cm, a waist girth is set to 66 cm, and a hip girth is set to 92 cm.

The vertical partitions 2 are also arranged perpendicularly on a surface of the back panel 1, and spaced 8-10 cm from a central symmetry axis to each side. In this embodiment, a total of five vertical partitions 2 are arranged at intervals of 8 cm (it should be noted that vertical partitions 2 in a same vertical direction form a single piece, but they may be mounted by sections during actual production). The vertical partitions 2 are fixedly connected to the horizontal partitions 3, such that the vertical partitions 2 and the horizontal partitions 3 are fixed to each other in both vertical and horizontal directions and are connected to a surface of the back panel 1, and a plurality of test compartments 4 are formed by the vertical partitions 2 and the horizontal partitions 3.

In some test compartments 4, a test fabric strip 5 is arranged, an upper end of the test fabric strip 5 is bounded to an outer edge of one horizontal partition 3 by an adhesive tape, a lower end of the test fabric strip 5 is left hanging freely, and a length of the test fabric strip 5 is generally 10-15 cm, which may be slightly adjusted according to specific positions. In a general test, at least two test compartments 4 under the horizontal partitions 3 at the hip girth line, the waist girth line, and the bust girth line are selected to mount the test fabric strips 5, such that more accurate results are obtained.

Since the test compartment 4 is covered by the clothing after the prosthesis is dressed, an image sensor 6 is also arranged in the test compartment 4 where the test fabric strip 5 is placed, so as to capture images of the condition of the test fabric strip 5 during the test. The image sensor 6 may be connected to a monitoring device via a cable, such that test personnel may observe the conditions of the test fabric strip 5 outside a testing environment.

During the specific test, the clothing is put on the dummy, and a large-diameter fan is positioned 2.5 m in front of the dummy to blow air to the dummy in a direction perpendicular to the back panel 1 a preset wind speed of level 8 (17.2-20.7 m/s). Since the fan is a relatively larger wind source relative to the dummy, a wind field where the dummy is located can be considered as a wind field with relatively stable wind source at various locations. Although all test compartments 4 formed on the dummy are not in a same plane and vary in angle relative to the wind source, differences between the test compartments are negligible relative to the wind field with an overall stability at each location.

By observing fluttering states of the test fabric strips 5 on the dummy, a windproof level of the clothing is determined according to the fluttering states of the test fabric strips 5. According to test statistics of 50 pieces of clothing, the windproof levels of the test fabric strips 5 are classified as follows: when the test fabric strips 5 are continuously kept parallel to the horizontal partitions 3, the windproof level is Level 0, in this case, the clothing is suitable for indoor wearing or mild wind environment; when the test fabric strips 5 flutter in an inclined manner and a distance between the lower end of the test fabric strip 5 and the horizontal partition 3 connected to the test fabric strip 5 is less than 1 cm, the windproof level is Level 1, in this case, the clothing can withstand light wind; when the test fabric strips 5 flutter continuously in a form of flapping, the windproof level is Level 2, in this case, the clothing is suitable for daily wear in normal weather; when the test fabric strips 5 flutter intermittently, the windproof level is Level 3, in this case, the clothing is suitable for outdoor activities with strong winds; and when the test fabric strips 5 are stationary, the windproof level is Level 4, in this case, the clothing is suitable for outdoor activities in bad weather or extreme environments. Since structures of different parts of an item of clothing may be different, the test fabric strips 5 in different test compartments 4 may exhibit different fluttering states, therefore, the corresponding windproof levels of the clothing at each part can be clearly determined according to the above evaluation criteria, a clothing designer can adjust the structures of different parts of the clothing according to the windproof levels determined by the fluttering states of the test fabric strips 5, for example, an additional layer of windproof cloth is added in a position where the test fabric strips 5 remain horizontal. Therefore, the testing method can help technicians to perform secondary reinforcement of windproof performance on the clothing structure.

The above embodiment describes a dummy representing the front half of the human torso. However, it should be noted that a dummy representing a complete human torso may be constructed as needed. That is, the vertical partitions 2 and the horizontal partitions 3 are arranged on a back side of the back panel 1 to form the test compartments 4, such that the windproof test of the clothing from the front and back directions can be performed.

In another embodiment, the dummy is set as a left half or a right half of a human torso. In this embodiment, a transparent back panel is used, and the transparent back panel is parallel to a front-back direction of the human torso. The horizontal partitions are also arranged at a hip girth line, a waist girth line, and a bust girth line, and the vertical partitions are arranged perpendicular to the transparent back panel and parallel to a left-right direction of the human torso. The setting of the test fabric strips is the same as that in the above embodiment, and will not be further described herein. In addition, since a transparent back panel is used, conditions of the test fabric strips in the test compartments can be directly observed through the transparent back panel, so an image sensor is not required in the test compartment. During test, this embodiment is primarily used to test the lateral windproof performance of the clothing, and only left or right half of the clothing needs to be worn on the dummy, in this way, the transparent back panel will not be blocked, and the windproof level can be determined by directly observing states of the test fabric strips in the test compartments.

What is claimed is:

1. A clothing windproof performance testing tool, comprising:
a dummy, wherein the dummy comprises a transparent back panel, vertical partitions, and horizontal partitions; the transparent back panel has a projected contour of a human torso, the vertical partitions are fixed onto the transparent back panel at intervals in a horizontal direction, a front side edge of each the vertical partition has a concave-convex structure, and forms a three-dimensional contour of the human torso around front side edges of the vertical partitions; and the horizontal partitions are fixed onto the transparent back panel at intervals and are also fixedly connected to the vertical partitions, the vertical partitions and the horizontal partitions are enclosed to form a plurality of test compartments, each the test compartment is provided with a test fabric strip, an upper end of the test fabric strip is connected to a top surface of the test compartment, and a lower end of the test fabric strip is left hanging freely.

2. The clothing windproof performance testing tool according to claim 1, wherein the upper end of the test fabric strip is connected to a front side edge of the horizontal partition.

3. The clothing windproof performance testing tool according to claim 1, wherein a length of the test fabric strip is 10-15 cm.

4. The clothing windproof performance testing tool according to claim 1, wherein the horizontal partitions are arranged at positions corresponding to a hip girth line, a waist girth line and a bust girth line of the dummy.

5. The clothing windproof performance testing tool according to claim 1, wherein a distance between adjacent the vertical partitions is 8-10 cm.

6. A clothing windproof performance testing tool, comprising a dummy, wherein the dummy comprises a back panel, vertical partitions, and horizontal partitions; the back panel has a projected contour of a human torso, the vertical partitions are fixed onto the back panel at intervals in a horizontal direction, a front side edge of each the vertical partition has a concave-convex structure, which forms a three-dimensional contour of the human torso around front side edges of the vertical partitions; and the horizontal partitions are fixed onto the back panel at intervals and are also fixedly connected to the vertical partitions, the vertical partitions and the horizontal partitions are enclosed to form a plurality of test compartments, each the test compartment is provided with a test fabric strip and an image sensor, an upper end of the test fabric strip is connected to a top surface of the test compartment, a lower end of the test fabric strip is left hanging freely, and the image sensor is configured to capture state images of test fabric strips.

7. The clothing windproof performance testing tool according to claim 6, wherein the upper end of the test fabric strip is connected to a front side edge of the horizontal partition.

8. The clothing windproof performance testing tool according to claim 6, wherein a length of the test fabric strip is 10-15 cm.

9. The clothing windproof performance testing tool according to claim 6, wherein the horizontal partitions are arranged at positions corresponding to a hip girth line, a waist girth line and a bust girth line of the dummy.

10. The clothing windproof performance testing tool according to claim 6, wherein a distance between adjacent the vertical partitions is 8-10 cm.

11. A clothing windproof performance testing method, wherein the method is conducted based on the clothing windproof performance testing tool according to claim 1, wherein a clothing to be tested is worn on the dummy, and a fan is placed in front of the dummy to blow toward the dummy at a fixed wind speed; by observing fluttering states of test fabric strips on the dummy, a windproof level of the clothing is determined according to the fluttering states of the test fabric strips; when the test fabric strips are continuously kept parallel to the horizontal partitions, the windproof level is level 0; when the test fabric strips flutter in an inclined manner, and a distance between the lower end of one test fabric strip and the horizontal partition connected to the one test fabric strip is less than 1 cm, the windproof level is level 1; when the test fabric strips flutter continuously in a form of flapping, the windproof level is level 2; when the test fabric strips flutter intermittently, the windproof level is level 3; and when the test fabric strips are stationary, the windproof level is level 4.

* * * * *